April 28, 1942. W. A. SAUL 2,281,517

THERMOSTAT

Filed Sept. 14, 1940 2 Sheets-Sheet 1

Waldo A. Saul
Inventor
Haynes and Koenig
Attorneys

April 28, 1942.  W. A. SAUL  2,281,517
THERMOSTAT
Filed Sept. 14, 1940  2 Sheets-Sheet 2

Waldo A. Saul
Inventor
Haynes and Koenig
Attorneys

Patented Apr. 28, 1942

2,281,517

UNITED STATES PATENT OFFICE 2,281,517

THERMOSTAT

Waldo A. Saul, Lexington, Mass., assignor to Metals & Controls Corporation, Attleboro, Mass., a corporation of Massachusetts Application September 14, 1940, Serial No. 356,717

20 Claims. (Cl. 200—138)

This invention relates to thermostats, and more particularly to thermostats containing composite thermostatic elements wound in the form of a helix such as shown and described in Parsons Patent 2,121,259.

Among the objects of the invention may be noted the provision of a simple and compact thermostat embodying a thermostatic element such as shown in said Parsons patent, which operates as a rate of change thermostat, sensitive to rates of change of temperature; the provision of such a thermostat which in certain useful respects is not affected by ambient temperature changes; and the provision of a thermostat of the class described which operates with a snap action, thereby eliminating or decreasing arcing between contacts. Other objects will be in part obvious and in part pointed out hereinafter.

The invention accordingly comprises the elements and combination of elements, features of construction, and arrangement of parts which will be exemplified in the structures hereinafter described, and the scope of the application of which will be indicated in the following claims.

In the accompanying drawings in which are illustrated several exemplary embodiments of the invention, Fig. 1 is a plan view of one type of thermostat made in accordance with the present invention;

Figure 1:
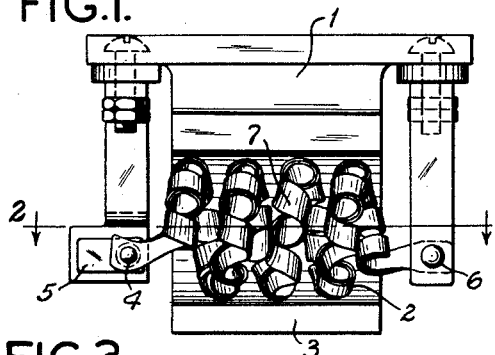

The present invention refers to composite thermostat elements of the type shown and described in Parsons Patent No. 2,121,259, and to rate-of-change thermostats embodying these composite elements. An element of this type may be made by first winding a narrow strip of composite thermostatic metal, such as bimetal, into a helical form having a relatively small diameter. This minor helix is then wound as a second or major helical form of relatively large diameter, thus forming a compound or double helical thermostatic element, or a peripherally continuous operating member, as described in said Parsons Patent 2,121,259. The compositemetal or bimetal helix or spring so formed will expand or contract lengthwise with change of temperature. The amount of movement for a given temperature change is controlled by the relation between the various dimensions of the element and the direction of movement is controlled by the direction of winding of the two helices, and the relative positions of the high and low expansion sides of the bimetal.

Referring to the drawings, a thermostatic element is shown at 1, embodying a helix as described above, shown at 2. The thermostat 1 is formed with a shield 3 in the form of a halfcylinder, located close to the outer portion of the helix 2. The shield is so constructed that it does not readily transmit heat or has a relatively large heat mass and therefore keeps the surrounded portion of the helix from rising in temperature as fast as the outer side of helix, for quick temperature changes, but does allow all portions to change slowly in temperature with slow changes in ambient temperature. The helix operates a movable contact 4, which cooperates with a stationary contact 5, to open or close a circuit. The helix itself is supported at the opposite end, as shown at 6, by attaching it to the main thermostat body 1.

Figure 2:
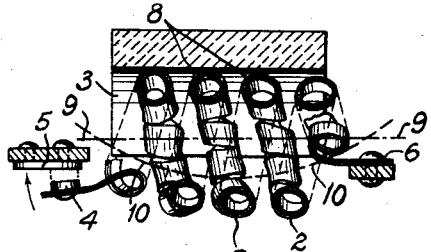
Fig. 2 is a cross-section taken along the line 2—2 of Fig. 1.
Figure 3:
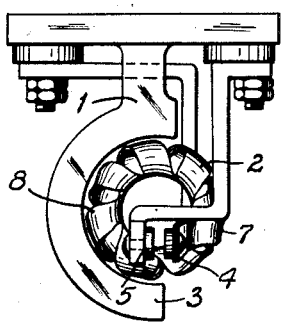
Fig. 3 is an end elevation of the construction shown in Fig. 1.

The thermostat is shown in Figures 1 and 2 as being in the open position. Gradual changes in the ambient temperature will not close the contacts, since the helix will expand and contract in a horizontal direction, rather than downwardly to bring the contact 4 into operative association with the stationary contact 5. However, a sudden rise in ambient temperature will affect the more exposed portion of the helix at 7, for example, more quickly than the portion 8, which is closely fitted to the shield 3. As a result, the exposed portion of the helical turns will move more than the portions next to the shield, and the helix will bend, deflecting its axis from the position shown by dotted line 9, to the position shown by dotted line 10. This will operate to bring the contacts 4 and 5 together, and close a circuit. To determine the direction of axial movement, i. e., expansion or contraction, with temperature rise, the following rule can be observed: If the high expansion side of the bimetal is on the inside of the minor helix, and both minor and major helices are wound with the same direction of pitch, i. e., both left-hand screw or both right hand, the major helix will contract on being heated. If the minor and major helices are wound on opposite screws, i. e., one left, and the other right, the major helix will expand on being heated. On the other hand, if the high expansion side is on the outside of the minor helix, the opposite is true, that is; same screw—expands on heating; opposite screw—contracts on heating. To determine the direction of bending movement when one side of the major helix is heated more than the other side, the following rule can be observed: If the major helix is so wound that it expands axially when its whole body is heated, then if only one side is heated, the free end of the major helix (assuming one end is fastened) will bend toward the heated side. If the major helix is so wound as to contract axially when its whole body is heated, then the free end will bend away from the heat. For example, in Figure 2, the major helix is so wound that it contracts on heating. Then when the portion of it not surrounded by the shield is heated, the free end 4 bends toward the stationary contact 5. It will be clear, of course, that by reversing the position of the layer of relatively high expansion and that of relatively low expansion or by otherwise properly changing the direction of axial movement of the major helix, the helix will curve in the opposite direction as the temperature rises, and if the contacts are closed when the thermostat is in the Fig. 2 position, they will open as it responds to a rapid increase in temperature.

Figure 4:
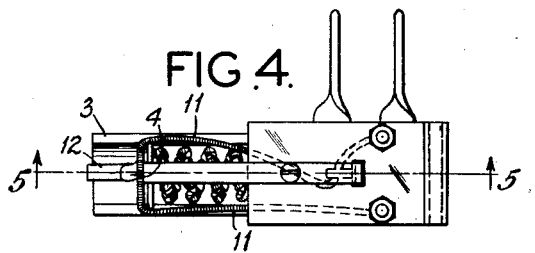
Fig. 4 is a plan view of an alternative embodiment of the invention.
Figure 6:
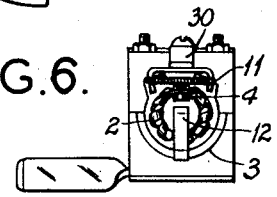
Fig. 6 is a left-end elevation of the embodiment shown in Fig. 4.
Figure 5:
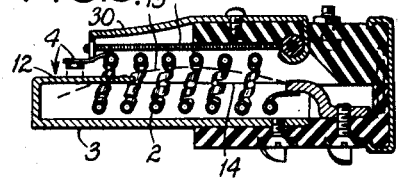
Fig. 5 is a cross-section taken along the line 5—5 in Fig. 4.

An alternative embodiment is shown in Figures 4, 5 and 6. Here the shield 3 is present as before, but the device is operated by means of a heating wire 11, located on the side of the helix opposite the shield 3. Movable contact 4 is as described above, but stationary contact 12 is made in the form of a long bar. Heating wire 11 is conveniently supported on member 30 which is insulated from the controlled circuit. Gradual changes in ambient temperature will cause the helix to expand or contract in a horizontal direction, leaving the contacts 4 and 12 unaffected. However, the application of current to heating wire 11 will cause the helix to bend in an appropriate direction, as indicated in Fig. 5, where the axis of the helix is shown passing into the curved line 13 from the straight line 14 position. The Fig. 5 switch is adapted to close a circuit upon the passage of current through the heating wire 11. By reversing the positions of the layers of bimetal, or by otherwise properly changing the direction of axial movement of the major helix, the switch may be caused to open upon passage of current through this heating wire 11.

Figure 7:
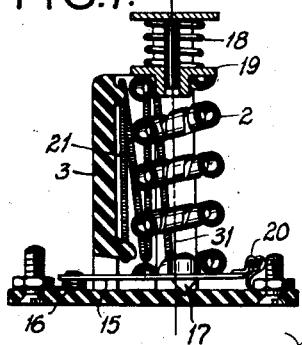
Fig. 7 is a cross-section of an alternate embodiment of the invention.
Figure 8:
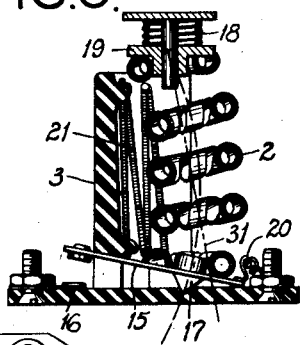
Fig. 8 is a cross-section of the Fig. 7 embodiment in a different operating position.
Figure 9:
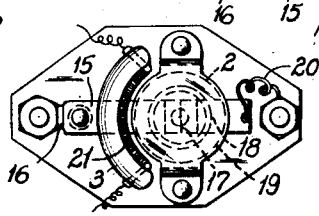
Fig. 9 is a top plan view of the embodiment shown in Figures 7 and 8.

Figures 7, 8 and 9 show a still different embodiment of the present invention. Here the helix 2 is mounted in operative association with a movable contact-carrying lever 15, which cooperates with a fixed contact 16. The lever 15 is mounted in turn on a fulcrum 17. The helix 2 on its opposite end, is in operative association with a simple coiled spring 18 through a movable plate 19. A pigtail 20 is conveniently employed to allow for the motion of the lever 15 when it operates. In this embodiment, a heater 21 is positioned adjacent to one side of the helix. As the ambient temperature changes gradually, the helix 2 will expand or contract. This expansion or contraction is absorbed by the spring 18, and its effect is thus minimized on the lever 15. However, upon the passage of substantial current through heater 21, the center of the helix will bend away from the heat to the Fig. 8 position. As the center of pressure of the helix illustrated by line 31 passes the fulcrum 17, the lever 15 will snap open with an abrupt movement, breaking the contact. It is of course clear (as explained above) that by reversing the position of the high expansion and low expansion layers in the element, and by placing the fulcrum point initially on the left of the axis line of the element, the device can be conveniently converted to a switch closing mechanism.

Figure 10:
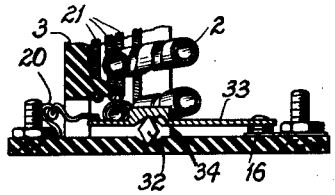
Fig. 10 is a partial cross-section of an alternative form of the Fig. 7 embodiment of the invention.

Fig. 10 illustrates a variation of the Fig. 7 embodiment. Here the fulcrum 32 is floating, instead of being attached to the movable arm. The movable arm 33 has a valley 34 which cooperates with the fulcrum 32 to position the arm 33 to contact the stationary button 16. The operation of this device is similar to that of the Fig. 7 embodiment.

Figure 11:
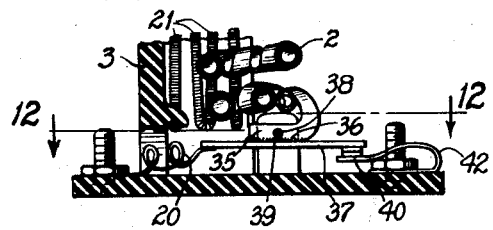
Fig. 11 is a partial cross-section of still another embodiment of the Fig. 7 form of the invention; and, Fig. 12 is a section taken along the line 12—12 in Fig. 11.
Figure 12:
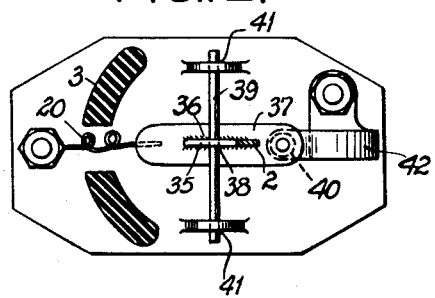

Figures 11 and 12 illustrate a still further variation of the Fig. 7 embodiment of the invention. Here the bottom portion of the helix 2 is brought down in the form of a portion 35, which is attached as by soldering or welding at 36, to the movable arm 37. The portion 35 has an opening 38 adapted to receive a rod 39 which positions the movable arm 37 in relation to the relatively stationary contact 40. It will be understood of course that the rod 39 is held in suitable openings 41 in arms projecting upwardly from base.

Figures 11 and 12 likewise illustrate a preferred embodiment of the relatively stationary contact 40. It will be noted that this contact is mounted upon a spring member 42 adapted to retain the contact 40 in cooperation with the arm 37 over a relatively limited area of movement. This eliminates any arcing caused by creeping of the thermostat prior to snapping the arm 37 out of contact with button 40. The operation of the Figures 11 and 12 embodiment is analogous to that of the Fig. 7 embodiment.

From the foregoing description, it will be apparent that the present invention provides a simple, economically constructed switch, which is sensitive to rate of change of temperature. This device moreover, requires only one thermostatic element. It may be conveniently employed for any of the usual purposes, such as opening or closing a circuit in a motor protection device, fire alarm, to operate a valve, or for other purposes where it is desired that the thermostat shall be independent of slowly changing ambient temperature, but responsive to rate-of-change of temperature. Moreover, the embodiment shown in Figures 7–12 operate with a snap action, thus avoiding or reducing arcing between the contacts and thereby prolonging their life.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

What is claimed is:

1. A thermostat comprising a helix composed of a coiled strip of composite metal and means for causing one portion of the helix to respond more rapidly to temperature change than another portion.

2. A rate of change thermostat comprising a coil composed of a strip of composite metal and means for causing one portion of the coil to respond more rapidly to temperature change than another portion.

3. A rate of change thermostat comprising a coil composed of a strip of composite metal and means adjacent thereto to cause localized application of heat thereto upon a relatively fast heat application.

4. A rate of change thermostat comprising a coil composed of a strip of composite metal and means for locally heating the coil.

5. A thermostatic element comprising strips of metal of different coefficients of thermal expansion rigidly connected along their length and extending progressively about a first axis, which in turn is extended progressively about a second axis, and means for causing one portion of the element to respond more rapidly to temperature change than another portion.

6. A thermostat comprising a helix composed of a coiled strip of composite metal and means comprising a shield for causing one portion of the helix to respond more rapidly to temperature change than another.

7. A thermostat comprising a helix composed of a coiled strip of composite metal and means comprising a heating element for causing one portion of the helix to respond more rapidly to temperature change than another portion.

8. A thermostat comprising a helix composed of a coiled strip of composite metal, a fixed contact, a movable contact mounted on a fulcrum and located in operative relationship to said helix, and means for causing one portion of the helix to respond more rapidly to temperature change than another portion.

9. An article of manufacture comprising a bimetallic helix of axially elongated form comprising a succession of axially progressing coils, at least one of which has at least one loop about an axis transverse with respect to the axis of said coils, and means for causing one portion of the helix to respond more rapidly to temperature change than another portion.

10. A thermostatic element comprising strips of metal of different coefficients of thermal expansion rigidly connected along their length and extending progressively about a first axis, which in turn is extended progressively about a second axis, and means comprising a shield for causing one portion of the element to respond more rapidly to temperature change than another portion.

11. A thermostatic element comprising strips of metal of different coefficients of thermal expansion rigidly connected along their length and extending progressively about a first axis, which in turn is extended progressively about a second axis, and means comprising a heating element for causing one portion of the element to respond more rapidly to temperature change than another portion.

12. A thermostatic element comprising strips of metal of different coefficients of thermal expansion rigidly connected along their length and extending progressively about a first axis, which in turn is extended progressively about a second axis, a fixed contact, a movable contact mounted on a fulcrum and located in operative relationship to said element, and means for causing one portion of the element to respond more rapidly to temperature change than another portion.

13. An article of manufacture comprising a bimetallic helix of axially elongated form comprising a succession of axially progressing coils, at least one of which has at least one loop about an axis transverse with respect to the axis of said coils, and means comprising a shield for causing one portion of the helix to respond more rapidly to temperature change than another portion.

14. An article of manufacture comprising a bimetallic helix of axially elongated form comprising a succession of axially progressing coils, at least one of which has at least one loop about an axis transverse with respect to the axis of said coils, and means comprising a heating element for causing one portion of the helix to respond more rapidly to temperature change than another.

15. An article of manufacture comprising a bimetallic helix of axially elongated form comprising a succession of axially progressing coils, at least one of which has at least one loop about an axis transverse with respect to the axis of said coils, a fixed contact, a movable contact mounted on a fulcrum and located in operative relationship to said helix, and means for causing one portion of the helix to respond more rapidly to temperature change than another portion.

16. A rate-of-change thermostat comprising a compound helix of composite metal and means for locally heating one side of the helix.

17. A rate-of-change thermostat comprising a single compound helix of composite metal, said helix having axially directed movement in response to temperature change uniformly distributed about the periphery of the helix, and means for causing a differential temperature change of said periphery, whereby said helix undergoes a movement at right angles to said axially directed movement.

18. A rate-of-change thermostat comprising a single compound helix of composite metal, said helix having a movement in the direction of the axis of the helix when subjected uniformly to temperature change, and means for causing one portion of the helix to respond to temperature change more rapidly than another portion, whereby in response to said second change of temperature, said helix undergoes a motion in a direction at right angles to the axis of the helix.

19. An article of manufacture comprising a bimetallic helix of axially elongated form comprising a succession of axially progressing coils, at least one of which has at least one loop about an axis transverse with respect to the axis of said coils, a fixed contact, a movable contact mounted on a fulcrum and attached to said helix, and means for causing one portion of the helix to respond more rapidly to temperature change than another portion.

20. An article of manufacture comprising a bimetallic helix of axially elongated form comprising a succession of axially progressing coils, at least one of which has at least one loop about an axis transverse with respect to the axis of said coils, a relatively fixed contact mounted upon a spring member, a movable contact mounted on a fulcrum and located in operative relationship to said helix, and means for causing one portion of the helix to respond more rapidly to temperature change than another portion.

WALDO A. SAUL.